G. W. CAMPION.
LICENSE PLATE.
APPLICATION FILED SEPT. 11, 1920.
1,397,032. Patented Nov. 15, 1921.
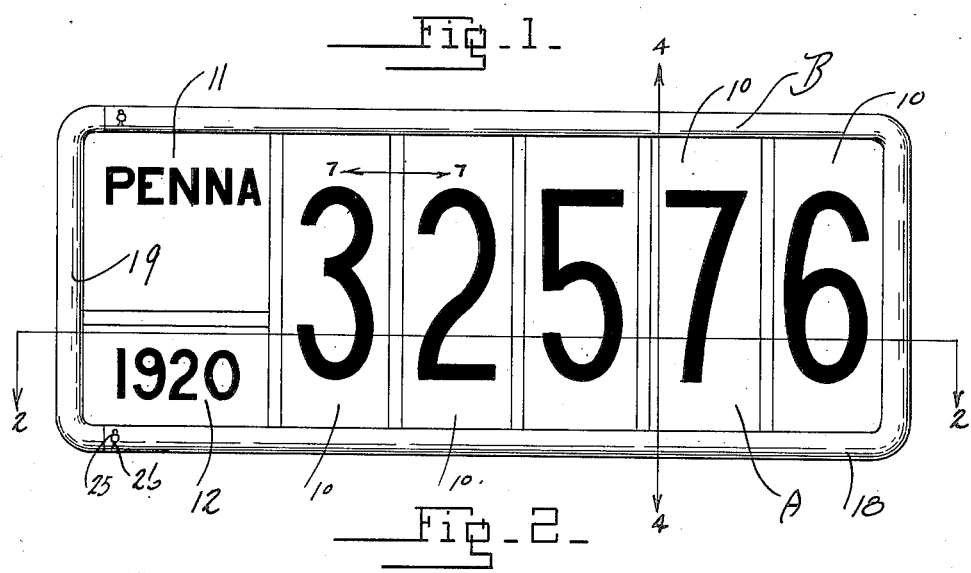
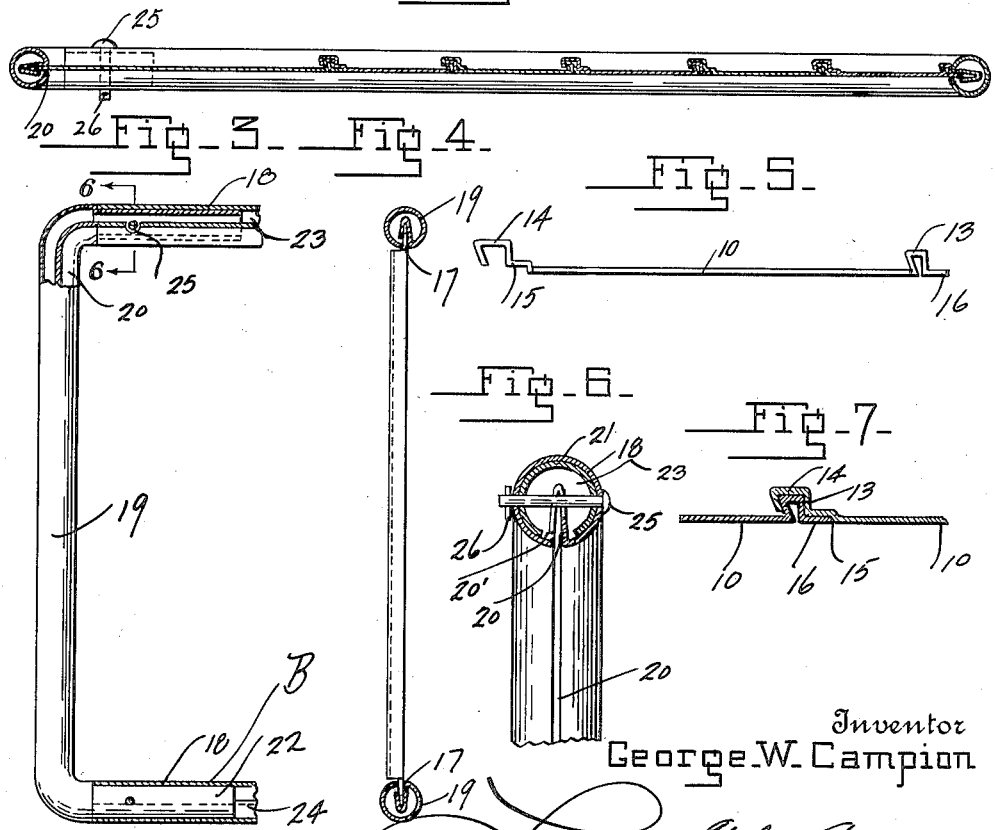
Inventor
George W. Campion

UNITED STATES PATENT OFFICE.

GEORGE WARNER CAMPION, OF OWEN SOUND, ONTARIO, CANADA.

LICENSE-PLATE.

1,397,032.     Specification of Letters Patent.     Patented Nov. 15, 1921.

Application filed September 11, 1920. Serial No. 409,585.

*To all whom it may concern:*

Be it known that I, GEORGE W. CAMPION, subject of the King of Great Britain, residing at Owen Sound, Province of Ontario, and Dominion of Canada, have invented certain new and useful Improvements in License-Plates, of which the following is a specification.

My present invention relates to improvements in license plates or identification tags for use on motor vehicles or the like.

An important object of the invention is the provision of a license plate so arranged that the number on the plate can be retained permanently, it being necessary to merely change that part of the plate pertaining to the year, as when annual registration is required.

A further object of the invention is the provision of a license plate having the individual figures thereon so arranged that the purchaser such as a municipality or State could use the same figures for many years. Each year issuing a new serial number or rearrangement of the old serial number to the licensor, by making it mandatory that the licensor turn in his license plate at the expiration of a predetermined period.

Other objects and advantages of the invention will be apparent during the course of the following description.

In the accompanying drawings forming a part of this specification and in which like numerals are employed to designate like parts throughout the same, Figure 1 is a front elevation of the license plate embodying my invention.

Fig. 2 is an enlarged horizontal sectional view taken on the line 2—2 of Fig. 1.

Fig. 3 is an enlarged fragmentary side elevation of the end frame of my license plate and the construction thereof.

Fig. 4 is an enlarged vertical sectional view taken on the line 4—4 of Fig. 1.

Fig. 5 is a plan view of a section of my license plate.

Fig. 6 is an enlarged cross section taken on the line 6—6 of Fig. 3.

Fig. 7 is a sectional view taken on the line 7—7 of Fig. 1 and showing the means of interlocking the identification sections of my invention.

In the drawings wherein for the purpose of illustration is shown a preferred embodiment of my invention, the letter A designates generally the identification part of my license plate, and B the frame containing the identification part A.

The identification part A is preferably formed of a plurality of sections comprising a series of number plates 10, each having a single number thereon; the State plate 11; and year plate 12. The plates 10, 11 and 12 are provided with male coupling members 13 and female coupling members 14, preferably formed integral therewith and of such construction that they can be readily stamped directly upon the plates. The male member 13 of one plate is adapted to fit within the female member 14 of its adjacent plate, the female members having preferably an additional recess 15 therein to receive the end 16 of its adjacent plate, this construction being provided in order that when the various plates are assembled and coupled together their faces will all be in the same plane, and a more rigid and unitary structure provided. The coupling members 13 and 14 are so arranged as to terminate short of the ends of the plates, thus providing projecting portions 17 forming the ends of the plates, said portions having smooth and uninterrupted faces.

The frame portion B is preferably formed in two sections 18 and 19, being constructed of substantially tubular material and having a substantially V shaped recess portion 20 stamped therein one leg of the recess portion being free. The sections 18 and 19 are so formed that when connected together they form a frame or binding whereby the projecting portions 17 upon the plates 10, 11 and 12 will be engaged within the recessed portion 20. The resiliency given to the frame structure by reason of the free end of the recessed portion will have a tendency to more firmly engage and efficiently hold the license plates. In the form illustrating my invention as shown in Fig. 1, it is preferred to have the section 18 form practically 3 sides of the frame in order that the plates may be readily and conveniently adjusted in their place. The end section 19 is provided with stems 21 and 22 thereon, smaller in cross section than the cross section of the stems 23 and 24 of the other section and provided with a slot 20′ in order that the stems will interfit and the external surfaces of the sections 18 and 19 be flush at the point of juncture. A bolt or pin 25 having a cotter pin 26 securely fastens the sections 18 and 19 together, although means may here be used to place a Government seal whereby the plates could only be removed, except without detection, under official supervision.

It is to be understood that the form of my invention herewith shown and described is to be taken as a preferred example of the same, for it may be desired to form the serial number and State identification into one plate, with a separate plate for the date of issuance. Various changes in the shape, size and arrangement of parts may be resorted to without departing from the spirit of the invention or the scope of the subjoined claims.

I claim:

1. In a license plate the combination of a plurality of plates defining a serial number, a State and date of issuance, said plates having male and female couplings formed rigid therewith, the plates when assembled being so arranged that their faces are in the same plane.

2. In a license plate, the combination of a plurality of plates defining a serial number, a State, and date of issuance, said plates having male and female couplings thereon, the couplings terminating short of the ends of said plates to allow projecting ends upon the plates having uninterrupted faces; and a frame detachably receiving the projecting ends of said plates to hold them in rigid relation.

3. In a license plate the combination of a plurality of connected plates defining a serial number, said plates having male and female couplings formed integral therewith, the couplings terminating short of the ends of said plates to allow projecting ends upon the plates, said ends having uninterrupted faces; a substantially tubular frame formed of sections, said sections having a recess therein adapted to receive the projecting ends of said plates; and means connecting said tubular sections to hold the plates in rigid relation.

4. A license plate, comprising a tubular frame having a resilient seat formed inwardly thereof, and identification means carried by said frame having certain portions extending into said seat.

5. A license plate, comprising a tubular frame having a substantially V-shaped seat extending inwardly thereof, and identification means carried by said frame, having certain portions extending into said V-shaped seat.

6. A license plate, comprising a tubular frame, said frame being split about its periphery and provided with an inwardly bent seat having one free leg thereon, and identification means carried by said frame having certain portions extending into said seat to be resiliently maintained in position by said frame.

GEORGE WARNER CAMPION.